Oct. 11, 1966 G. H. LOCKWOOD ET AL 3,277,868
ADHESIVE APPLICATOR INCLUDING ADHESIVE-RECIRCULATION MEANS
Filed Feb. 18, 1963 3 Sheets-Sheet 1
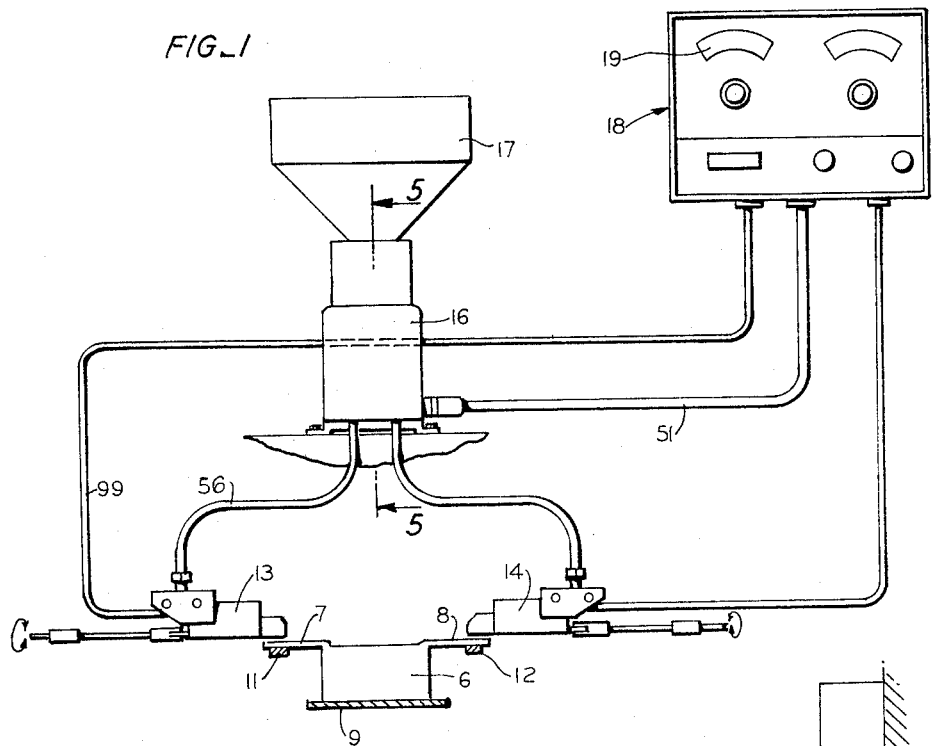
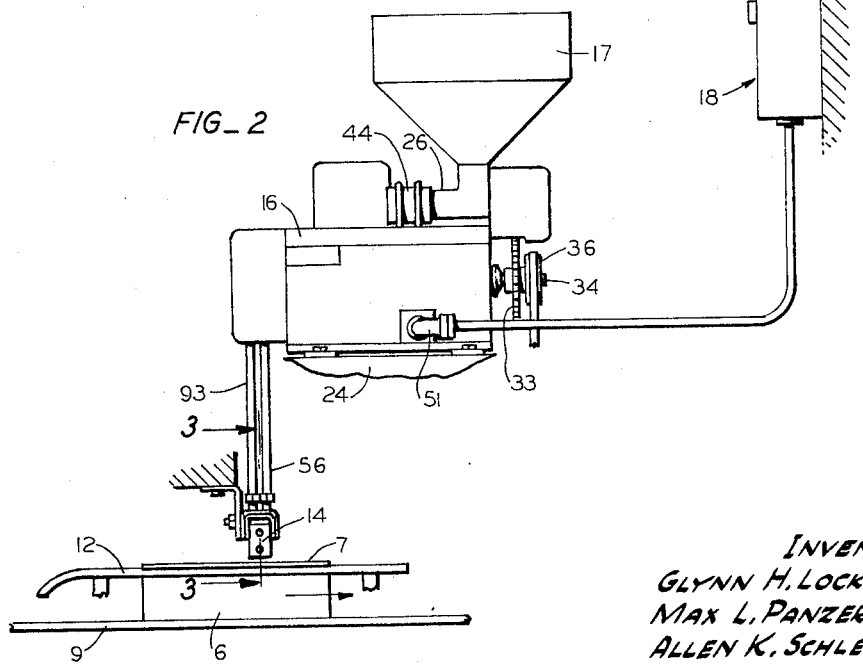
INVENTORS
GLYNN H. LOCKWOOD
MAX L. PANZER
ALLEN K. SCHLEICHER
ALLAN M. HUDSON
BY: Lothrop & West
ATTORNEYS Oct. 11, 1966  G. H. LOCKWOOD ET AL  3,277,868
ADHESIVE APPLICATOR INCLUDING ADHESIVE-RECIRCULATION MEANS
Filed Feb. 18, 1963  3 Sheets-Sheet 2
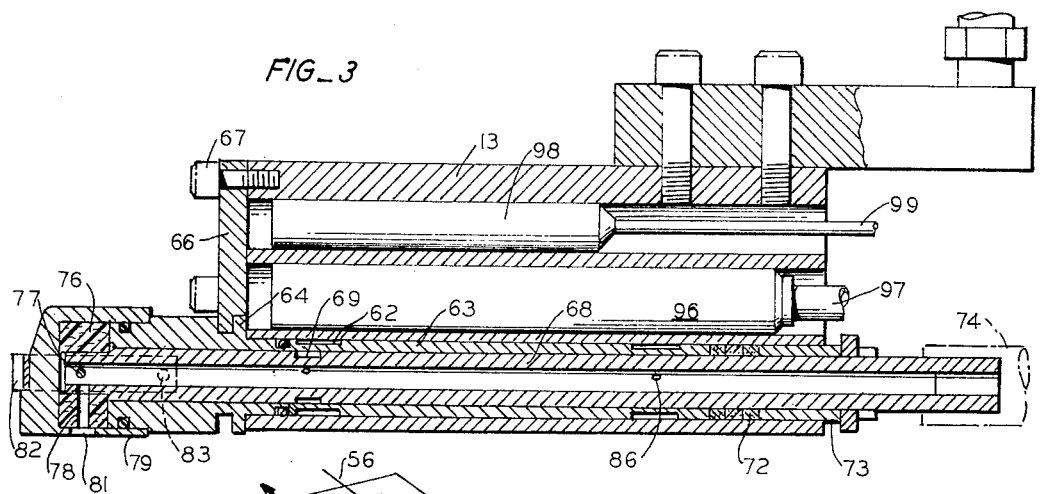
FIG_3
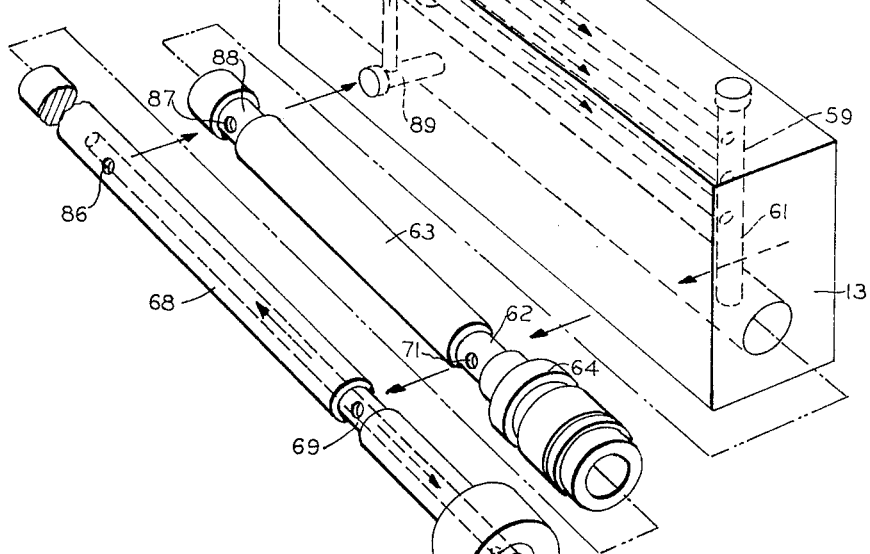
FIG_4
INVENTORS
GLYNN H. LOCKWOOD
MAX L. PANZER
ALLEN K. SCHLEICHER
ALLAN M. HUDSON
BY: Lothrop & West
ATTORNEYS

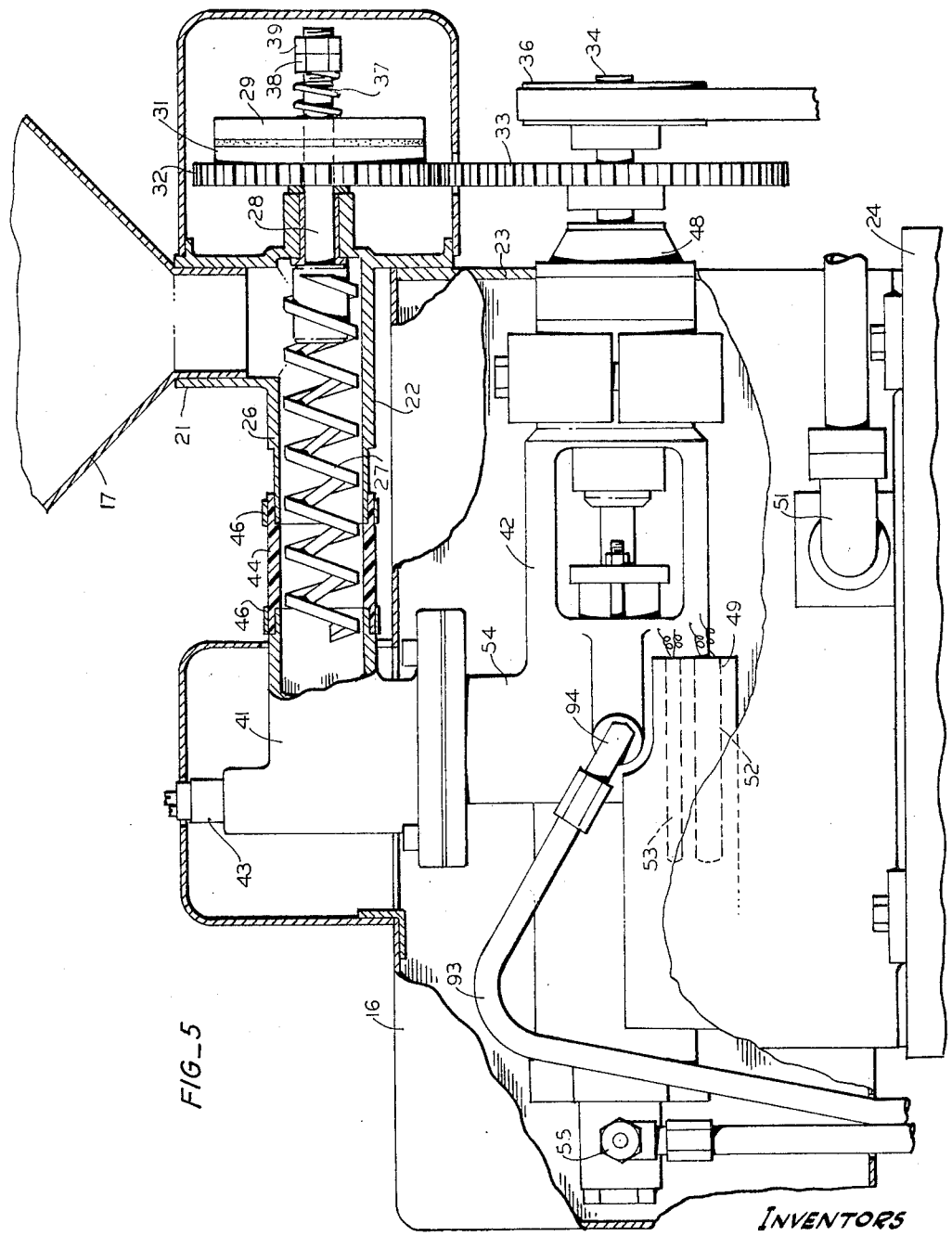
FIG_5
INVENTORS
GLYNN H. LOCKWOOD
MAX L. PANZER
ALLEN K. SCHLEICHER
ALLAN M. HUDSON
BY: Lothrop & West
ATTORNEYS

United States Patent Office 3,277,868
Patented Oct. 11, 1966

3,277,868
ADHESIVE APPLICATOR INCLUDING ADHESIVE-RECIRCULATION MEANS
Glynn H. Lockwood, Carmel, Max L. Panzer, Pebble Beach, Allen K. Schleicher, Berkeley, and Allan M. Hudson, Carmel, Calif., assignors, by mesne assignments, to Lockwood Technical, Inc., Monterey, Calif.
Filed Feb. 18, 1963, Ser. No. 259,074
2 Claims. (Cl. 118—410)

The invention relates to means primarily useful in taking normally solid, cold adhesive material in any reasonable shape and melting it in an appropriate melting device and then transporting it to a location for application to an article to be sealed, such as a fiberboard package, with sufficient control over the hot melt adhesive so that the mechanism can readily be operated without difficulty.

In the application of hot melt adhesives, there is some difficulty in having the material sufficiently fluid in various parts of the mechanism as to be readily handled and yet to have the fluid material not become adhesively engaged with portions of the mechanism with which it is not supposed to adhere.

Another difficulty it to provide a hot melt adhesive applicator which dispenses, uniformly and repeatedly, measured or desired quantities of the hot melted adhesive at the desired point.

It is therefore an object of the invention to provide a hot melt adhesive applicator in which there is a sharp thermal distinction made between the feeding reservoir containing granular, pelletized or chip material and the melting area so there is not an undue intermix of the adhesive material Another object of the invention is to provide a reliable, pressurized supply of hot melted adhesive so that the dispensing mechanism can readily and appropriately operate.

Another object is to vary the adhesive delivery rate in a controlled manner.

A still further object of the invention is to provide a hot melt adhesive applicator in which the temperature values at sundry heating zones are appropriately maintained.

Another object of the invention is to maintain the melted adhesive material in the machine substantially out of contact with the atmosphere.

A further object of the invention is to supply melted adhesive as needed but without having a large amount of melted material in storage.

Another object of the invention is to provide a hot melt adhesive applicator which can readily be fabricated and utilized at a low cost and without substantial service or repairs.

Other objects together with the foregoing are attained in the embodiment of the invention described in the accompanying description and illustrated in the accompanying drawings, in which:

FIGURE 1 is a somewhat diagrammatic illustration of a hot melt adhesive applicator installed pursuant to the invention, portions being broken away and certain parts being omitted for clarity in disclosure;

FIGURE 2 is a side elevation of the structure illustrated in FIGURE 1;

FIGURE 3 is a view to a substantially enlarged scale showing in cross section the main portions of the applicator body and its attendant mechanisms, the plane of section being indicated by the line 3—3 of FIGURE 2;

FIGURE 4 is an isometric view showing in diagrammatic exploded form the arrangement of the applicator body; and FIGURE 5 is in general a side elevation to an enlarged scale of the structure shown in FIGURE 2 with portions being broken away to disclose the interior construction.

While the hot melt adhesive applicator is capable of being used with many different commercially available adhesives requiring an elevated temperature in order to be fluid, and while it can be utilized in connection with various different structures requiring the application of an adhesive, it has successfully been incorporated commercially as shown particularly in FIGURES 1 and 2.

To receive the adhesive there is provided a carton 6 having flaps 7 and 8. The carton is mounted on a conveyor belt 9 and the flaps rest in open position on support rails 11 and 12. It is desired to place a coating or an intermittent series of coatings of adhesive on the uppermost surfaces of the flaps 7 and 8. This is accomplished by applicator bodies 13 and 14 which are substantially identical so that allusion to one describes the other as well. The applicator bodies are supplied with a hot melt from a source at a supplying unit 16 fed from a reservoir 17. Appropriate temperatures are maintained by electrical heating means as controlled by a controller 18 which may have indicating devices 19 thereon.

In this particular form of the structure, the reservoir 17 is an open-topped container to receive in dry, solid form any suitable material which when appropriately heated becomes liquified and adhesive. The reservoir 17 at its lower end projects into a collar 21. This forms part of a feeding mechanism 22 mounted on a frame 23 supported on a base 24 in any convenient fashion. The feeding device 22 contains a tubular feeding chamber 26 intersecting the collar 21 and within which an open feed screw 27 or helix is disposed.

The feed screw is carried at one end of a shaft 28 on which an axially movable driven disk 29 is keyed. Rotatable on the shaft 28 alongside the disk 29 is a driving disk 31 rotated by means of an adjacent gear 32. Power is transmitted to the gear 32 from a driving pinion 33 on a shaft 34 carrying a belt-driven pulley 36. The drive is by any suitable means not shown. The disk 29 is pressed against the disk 31, thus forming a friction coupling, by means of a spring 37 adjustably compressed by a regulating nut 38 and a lock nut 39. Normally, driving torque is transmitted constantly to the screw or helix 27, but the screw rotates intermittently only as required to maintain the system full. When the pump and other cavities are full, the disks 29 and 31 slip with respect to each other until some amount of the melt has been discharged.

When the screw 27 is revolved, material flowing from the reservoir 17 through the collar 21 is transported through the chamber 26 to an elbow 41 forming part of a pump mechanism 42. The elbow 41 is of good thermal conducting material and is provided with an electric heating member 43, and so constitutes a preheat reservoir. Since it is desired to have a steep temperature gradient between the elbow 41 and the chamber 26, there is interposed between the two a bushing 44 conveniently fabricated of a suitable thermal insulating material such as "Teflon" held in position by clamp bands 46. With this arrangement the heater 43 can be operated so as to maintain a relatively high temperature in the elbow 41 yet the material being fed thereto does not get sufficient heat to melt within the chamber 26, the reservoir 17 or in any of the connecting passages leading to the elbow 41.

The elbow is part of the pump mechanism 42 arranged on the base 24 and driven by the horizontal shaft 34 which enters the pump housing 48 at one end. The pump itself is a positive displacement pump of any usual character so that it is not necessary to illustrate its interior construction. The body of the pump mechanism 42 is of good thermal conducting material and rests on a heating block 49 mounted on, and thermally insulated from, the base 24. Electric leads for the heater 52 within the heating block emerge at a fitting 51 and extend to a source of electric supply. The electrical energy supplied to the block 49 is transferred in large measure to the pump and its contents so as to raise the temperature therein. In addition to the heater 52 in the heating block, a thermostat 53 is provided in a convenient location. This affords control of the temperature of the pump. In a known way the electrical current is supplied through conductors including the thermostat 53 so as to maintain a set temperature within the pump.

Material advanced axially from the pump inlet 54 through a porous filter (not shown) to the pump outlet 55 is discharged in the present instance in a plurality of paths, the description of one applying to the other as well. From the pump outlet 55 there is an electrically heated flexible tube 56 serving as a conducting means carrying the pumped material to the adjacent applicator body 13. As particularly shown in FIGURE 4, material entering the applicator body from the conduit 56 travels into a passage 57 and divides to flow through a plurality of bores 58. These afford an increased surface adjacent to an electric heater within the thermally conducting applicator body so that the material is further heated.

The heated material is then collected in a manifold 59 within the applicator body and flows through a cross passageway 61 into a groove 62 formed in an applicator tube 63. This tube is mounted within the applicator body, being axially restrained. A collar 64 partially defines a groove near one end into which extends a plate 66 having appropriate fastenings 67. The tube 63 is generally fixed within the body and does not move axially or rotate, being appropriately clamped by the plate 66. The hub 63 is hollow and carries a hollow rod 68 journalled within the tube 63 and having a groove 69 therearound. A drilled opening (FIGURE 4) 71 affords free access between the grooves 62 and 69. The hollow rod 68 is rotatable within the tube 63 and leakage therebetween is precluded by packing 72 held in position by a packing gland 73. The hollow rod 68 at its exposed end is closed by a coupling 74 which also connects the rod 68 to any suitable sort of actuating device capable of rotating the hollow rod 68 within the tube 63.

At its opposite end the hollow rod 68 carries a valve disk 76 conveniently fabricated of glass-filled "Teflon" secured in position by a cross pin 77. The valve 76 has a radial bore 78 opening into the interior of the sleeve 68 and is a close fit within a stationary applicator head 79 surrounding the projecting end of the tube 63. The head 79 is substantially flat on the bottom and has a discharge opening 81 designed to align with the bore 78. The head is held in position against axial dislodgment and against rotation by a U-shaped spring strap 82 carried on a pair of projecting pins 83 on the tube 63. When the strap 82 is rotated upwardly, the head 79 is free to be axially withdrawn but otherwise is held exactly in position. The lower face of the head 79 is designed to come immediately into contact with the flaps such as 7 and 8, although the head may be positioned above and clear of the flaps in order to discharge material in the form of a bead.

When the sleeve 68 is oriented as shown in FIGURE 3, for example, the incoming fluid material flows freely through the grooves 62 and 69 into the interior of the sleeve 68 and thence through the radial bore 78 and out through the opening 81 for application. When the application is to be discontinued, the sleeve 68 is rotated through a suitable number of degrees and this not only rotates the bore 78 out of registry with the opening 81, but also rotates a cross bore 86 in the sleeve 68 into registry with an opening 87 in the tube 63. The opening 87 is in communication with a groove 88 establishing flow to a bore 89 communicating through a passage 91 with an outlet 92 in the applicator body. The arrangement of the openings and ports is such that when the bore 78 is turned to communicate with the opening 81, the openings 86 and 87 are out of registry so that return flow through the hollow interior of the sleeve 68 is blocked or obstructed, but when the bore 78 is out of registry or communication with the opening 81 then there is free flow between the openings 86 and 87.

Material flowing from the outlet 92 is carried by an appropriate carrying means 93 back to an inlet fitting 94 at the entrance of the pump mechanism 42 for recirculation.

The applicator body, being of good thermal conducting material, has its heater 96 supplied with electricity through appropriate conductors 97 and is likewise provided with a thermostat 98 having a connection 99 to the control 18 so that the supply of electricity to the heater 96 is regulated and the temperature of the applicator is correspondingly maintained at a set value automatically.

In the operation of this device, the pump heater 52 is separately energized under the control of the thermostat 53 as is the heater 43. When the pulley 36 is started, the main pump is energized and the feeding means, such as the screw 27, is likewise started. The material to be melted is then supplied from the reservoir through the elbow 41 into the inlet of the pump and is then discharged from the pump through the conducting means 56 into the applicator body. The material is further heated to the desired final temperature by the heater 96 within the applicator body, there being a good thermal transfer because of the plurality of bores 58. When the material is conducted to the opening 81 because the bore 78 is in the proper position, return flow is blocked and discharge is from the opening 81 onto the subjacent material. When, however, the material is no longer to be discharged from the applicator body, the sleeve 68 is rotated slightly, the opening 81 is obstructed, but the return path is open because of registry of the openings 86 and 87. The discharged material is then carried by an electrically heated flexible tube 93 back to the inlet of the pump. If a great deal of material is returned, then the addition of material from the heating elbow 41 is reduced, but if a great deal of material is discharged completely from the applicator body, then more material automatically flows in through the elbow 41 to the pump inlet. The feed screw clutch and worm act appropriately as previously described to maintain the pump, flexible tubes, heads and other voids fully charged at all times.

What is claimed is:

1. A hot melt adhesive applicator comprising a base, a pump mounted on said base, a preheat reservoir, means for feeding material from said reservoir to said pump, an applicator body having a discharge opening, means for conducting material from said pump to said discharge opening in said applicator body, means for carrying excess material from said applicator body adjacent said discharge opening back to said pump, a valve in said applicator body adapted in a first position to establish communication between said conducting means and said carrying means while obstructing said opening and in a second position to establish communication between said conducting means and said opening while obstructing said carrying means, means for heating said applicator body, and means for controlling the operation of said heating means in accordance with the temperature of said applicator body.

2. A hot melt adhesive applicator comprising a base, a pump mounted on said base, said pump having an inlet and an outlet, a reservoir mounted on said base, means for feeding material from said reservoir to the inlet of said pump, means for simultaneously driving said feeding means and said pump, means on said base for heating said pump, an applicator body having a discharge opening, a heater in said applicator body, means for conducting material from the outlet of said pump past said heater to said discharge opening, means for carrying excess material from said applicator body adjacent said discharge opening back to the inlet of said pump, and a valve in said applicator body for directing material from said conducting means selectively between said opening and said carrying means.

References Cited by the Examiner

UNITED STATES PATENTS

| | | | |
|---|---|---|---|
| 1,457,634 | 6/1923 | Neri | 222—146 |
| 1,968,992 | 8/1934 | Conkling | 222—146 |
| 2,111,761 | 3/1938 | Eckert | 118—602 X |
| 2,501,595 | 3/1950 | Bohannon. | |
| 2,700,260 | 1/1955 | Paulsen. | |
| 2,719,326 | 10/1955 | Dykehouse | 18—30 |
| 2,754,228 | 7/1956 | Bede | 117—105.1 |
| 2,783,735 | 3/1957 | Paulsen | 118—410 |
| 2,871,516 | 2/1959 | Sherman et al. | |
| 3,078,824 | 2/1963 | Bechle | 118—410 |

MORRIS KAPLAN, *Primary Examiner.*

JOSEPH B. SPENCER, RICHARD D. NEVIUS, CHARLES A. WILLMUTH, *Examiners.*